April 14, 1964     C. W. HARTMAN     3,129,400
VARIABLE RESISTOR WITH HIGH TORQUE ADJUSTMENT
Filed Jan. 2, 1962     2 Sheets-Sheet 1

INVENTOR
CLINTON W. HARTMAN
BY *Jennings B. Thompson*
ATTORNEY

April 14, 1964
C. W. HARTMAN
VARIABLE RESISTOR WITH HIGH TORQUE ADJUSTMENT
Filed Jan. 2, 1962
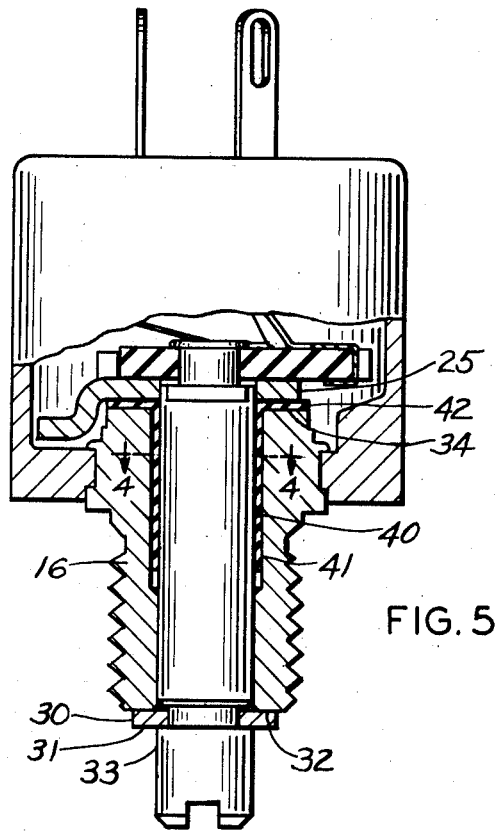
FIG. 5.
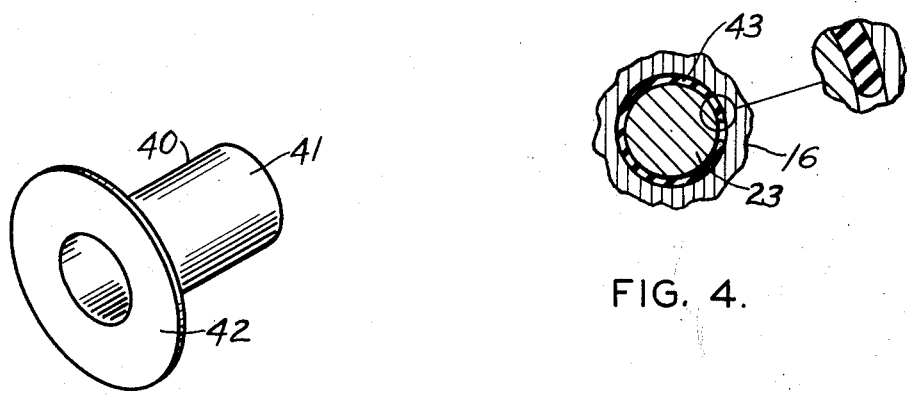
FIG. 6.
FIG. 4.
INVENTOR
CLINTON W. HARTMAN United States Patent Office 3,129,400
Patented Apr. 14, 1964

3,129,400
VARIABLE RESISTOR WITH HIGH TORQUE ADJUSTMENT
Clinton W. Hartman, Elkhart, Ind., assignor to CTS Corporation, Elkhart, Ind., a corporation of Indiana
Filed Jan. 2, 1962, Ser. No. 163,554
13 Claims. (Cl. 338—162)

This invention relates to variable resistors which are readily adjustable but which when adjusted as desired will resist change, even though they are subjected to the vibration and forces of acceleration produced by the missiles and rockets of our present space technology.

This is a continuation-in-part of my application filed June 27, 1960, Serial No. 38,851, entitled "Variable Resistor With Improved Control Shaft Bearings," now abandoned.

Ordinary variable resistors require a certain amount of torque to move their contacts along the resistive and conductive elements of the control. This torque is necessary to overcome the friction existing between the contacts and the resistive and conductive elements along which they travel plus the friction existing in the bearing of the operating shaft. However, these two sources of torque do not provide adequate resistance to rotation to insure that the setting of the control remains unchanged when it is subjected to constant vibration and forces of acceleration many times the force of gravity. Therefore, it is now necessary to provide additional braking means to resist these extraneous forces tending to cause changes in the setting of the control.

Various solutions have heretofore been suggested as this is no new problem. Previously, however, all suggested solutions have involved the use of many additional parts to provide the increased resistance to change which not only increased the cost of the unit but in general was found to be an unsatisfactory solution to the problem.

It is, therefore, the principal object of this invention to provide an improved manner of incorporating in a control an additional frictional force to resist changes in the adjustment of the control and to accomplish this with the addition of only one extra part.

It is an additional object of this invention to provide a brake for the operating shaft of the control which requires no adjustment after assembly of the control.

It is a further object of this invention to provide a variable resistor in which the force required to adjust the control will not change appreciably throughout its operating life.

A variable resistor in accordance with this invention has, in addition to its usual parts, a resilient, hollow, friction sleeve of substantially uniform wall thickness. This sleeve is compressed between the shaft and the housing for the shaft to the extent that its wall thickness is decreased from at least 15% to about 50% depending on the amount of frictional force required and the material used. This compressed sleeve exerts a uniform normal force against the shaft and resists rotation of the shaft in either direction.

The invention will now be described in detail in its preferred form as llustrated in the accompanying drawings, in which:

FIGURE 4 is a sectional view illustrating how the friction sleeve of FIGURE 3 appears when compressed between the shaft and the shaft housing with an enlarged view of one end to illustrate how the material is deformed when installed;

FIGURE 5 is a view partly in elevation and partly in vertical section illustrating a modified form of the invention; and FIGURE 6 is an isometric view of the modified friction sleeve illustrated in FIGURE 5.

Figure 1:
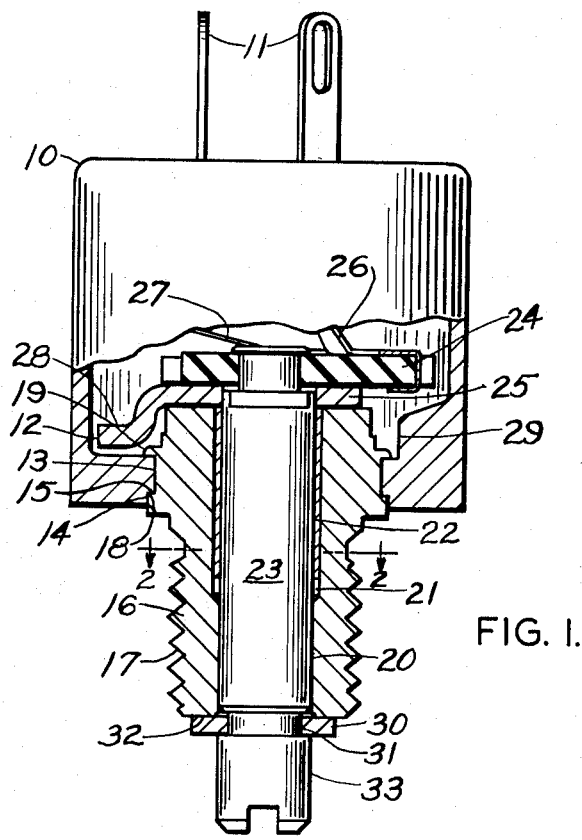
FIGURE 1 is a view partly in elevation and partly in vertical section of a variable resistor equipped with a hollow friction sleeve in compression between the shaft and the shaft housing.

A variable resistor of more or less conventional construction is shown in FIGURE 1. It has a housing 10 which is cylindrical in shape. At one end of the housing is located a base (not shown) upon which is mounted the usual concentric arcuate strips of resistive and conductive material (not shown). Terminals 11 pass through the base and are each electrically connected to one or the other of the strips mounted thereon.

The other end of the housing 10 is partially closed by the end wall 12. A hole 13 is provided therein which is counterbored at 14 to form the shoulder 15. The hole 13 is arranged to receive the mounting bushing 16 which has a shoulder 18 to engage the shoulder 15 on the housing and limit the distance the bushing can enter the housing. The bushing is rigidly attached to the housing by swaging its end over against the inside of the wall 12, as indicated at 19, forcing the shoulders 15 and 18 firmly into engagement.

The mounting bushing is equipped with threads 17 which allow the control to be mounted on a panel by inserting the threaded end of the bushing through a hole in the panel and then clamping the control to the panel by means of a nut which engages the threads.

A hole 20 passes through the mounting bushing to receive and rotatably support the shaft 23. The hole 20 is provided with a counterbore 21 which extends back from the inner end of the bushing for approximately half its length and which is designed to receive the friction sleeve 22 about which more will be said later.

Rigidly attached to the end of shaft 23 is the contact carrier 24 and the stop plate 25. The contact carrier is made of nonconductive material and, as its name implies, carries the contacts 26 and 27 and causes them to move along the appropriate resistive and conductive strip as the contact carrier 26 is rotated by the shaft 23. The stop plate 25 is equipped with an arm 28 which engages the stop 29 and serves to limit the amount of rotation of the shaft 23 and, consequently, the distance along the conductive and resistive strips that is traveled by the contacts 26 and 27. To complete the assembly of the shaft 23 a C-washer 30 is installed in the groove 31 which is located adjacent the end 32 of the mounting bushing 16. This C-washer, by engaging both the side 33 of the groove 31 and the end 32 of the mounting bushing, prevents the shaft 23 from further entering the housing 10.

All of the above described structure is conventional, with the exception of the friction sleeve 22, and is found with minor variations in all variable resistors of this type.

As set out above, the object of this invention is to provide means for resisting a change in the setting of the control. To do this some means of applying a brake to the shaft or some other rotating member must be provided. This invention applies the braking force directly to the operating shaft rather than to one of the other rotating components which was the method previously used. The braking force is applied directly to the shaft by surrounding the shaft with a resilient, friction sleeve, and compressing the walls of the sleeve between the shaft and the counterbore 21 of the bushing 16 to the extent that the sleeve acts as a brake on the shaft, resisting its rotation in either direction.

This sleeve acts just the opposite of a bearing, of course, in that its function is to increase not decrease the frictional force resisting rotation of the shaft. Some well-known bearing materials can be used for the friction sleeve of the invention, however, even though they are being used not as a bearing but as a brake. For example, the commercial embodiment of this invention uses a sleeve made from polytetrafluoroethylene filled with from 10% to 20% glass fibers. This material when used in the conventional manner provides a bearing which offers an extremely small amount of frictional resistance to the rotation of the shaft. When used in the manner taught by this invention, however, it does just the opposite—it offers considerable frictional resistance to the rotation of the shaft.

This material has good resiliency which is essential to this invention. For example, in the commercial embodiment of the invention the wall of the friction sleeve is usually compressed somewhere between 40–50%. This is a tremendously large amount of compression and exceeds the yield strength of the material by a considerable amount. Polytetrafluoroethylene, however, like any elastomer can be deformed a considerable amount; even to the point where it is permanently deformed, and still retain sufficient memory to want to try to return to its original shape. It is this memory characteristic which makes elastomers ideal for this invention since they can be greatly deformed without losing the ability to resist the force producing the deformation. In other words, a sleeve made from an elastomer can be compressed between the shaft and shaft housing of a control, and it will exert a force on the shaft equal to the force required to compress it continuously for the life of the control. This is an absolutely necessary characteristic for the material used in the practice of this invention.

Rubber, both natural and synthetic, and polytrichlorofluoroethylene are examples of other elastomers which can be used. Obviously, the resiliency and memory characteristics of all elastomers changes with their hardness, etc., so only those having a fairly low modulus of elasticity should be used. Otherwise the amount of compressive force required becomes excessive. The best results have been obtained where considerable deformation is necessary to obtain the proper normal force. This particularly improves the length of time that the sleeve will exert the desired normal force since the larger the amount of compression, the less effect wear will have on the force exerted by the sleeve.

The percentage of compression of the wall of the sleeve will depend on the material used, of course, but it must be substantial. As stated above, in the case of polytetrafluoroethylene the sleeve wall is usually compressed from 40–50%. This may go as low as 20% and produce satisfactory results if the compressive strength of the material is high or the friction force desired is small.

Figure 2:
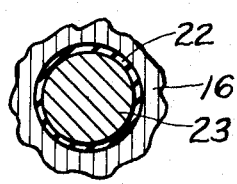
FIGURE 2 is a sectional view taken along line 2—2 of FIGURE 1.
Figure 3:
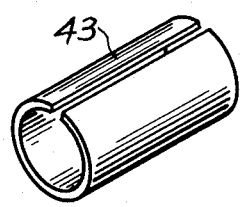
FIGURE 3 is an isometric view of a modified friction sleeve having a section of its wall removed for easier assembly in the control.

The friction sleeve 22 can be used with an unbroken wall section as shown in FIGURE 2 or with a portion of the wall removed as shown by the sleeve 43 in FIGURE 3. This latter type sleeve has certain advantages when an unusually large amount of compression is to be placed in the sleeve. When assembling the control, for example, the split sleeve can be more easily installed in the counterbore since its outside diameter can be readily changed. The shaft can then be forced through the sleeve with the resultant compressing of the walls being accomplished easier since deformation can take place circumferentially as well as longitudinally.

As an example of the practical application of this invention, in a particular control, an initial operating torque of 0.5 inch-ounces was specified with the additional requirement that the torque not change appreciably over the control life of 100,000 cycles. This was easily obtained with a friction sleeve of polytetrafluoroethylene filled with 15% glass. In addition, no appreciable change in the operating force was experienced throughout the life of the control. By adjusting the amount of compression imposed on the bearing sleeve, the force required to operate the control can be adjusted to meet most requirements.

Should it be necessary to increase the torque required to operate the shaft beyond what can be obtained by compressing the sleeve 22 in the manner described above, a modified sleeve 40 formed in the manner illustrated in FIGURE 6 can be used. This sleeve consists of the tubular sleeve section 41 and the laterally extending flange 42. FIGURE 5 illustrates how this bearing sleeve is installed in the control.

The additional amount of operating torque is obtained by compressing the flange 42 between the stop plate 25 and the inner end 34 of the mounting bushing. This results in an increase in the normal force between the stop plate and the flange 42 with a resultant increase in the force required to rotate the stop plate. The flange 42, then, provides additional means for increasing the torque requirements of the control.

To compress the flange 42 the length of the mounting bushing 16 plus the width of the C-washer 30 and the flange 42 is arranged to be greater than the distance from the side 33 of the groove 31 to the face of the stop plate 25 by the amount of compression desired to be placed into the flange 42. Since the C-washer must be in engagement with the end of the mounting bushing at all times to maintain the flange 42 in compression, the compressed flange not only functions to increase the torque requirements of the control; but it also insures that the control has a positive ground connection during its operating life.

The flange can be formed integrally with the sleeve as illustrated in FIGURE 4 or it can be an annular ring of resilient bearing material separate from the sleeve. It may even be of a different material than what is used in the sleeve since a material of different physical properties may be advantageous in some applications.

The sleeve of FIGURE 3 may also be equipped with a flange, either solid or with a section of it removed to correspond to the section removed from the wall of the sleeve if desired. For example, a material having a lower modulus of elasticity may be necessary to make the installation of the C-washer easier.

This invention can be embodied in all types of variable resistors, including these which are rectilinearly adjusted, without departing from the inventive concept herein disclosed. It is understood, therefore, that numerous changes in the details of construction and the combination and arrangements of parts may be made in the invention as described above without departing from the spirit and the scope of the invention as hereinafter claimed.

The invention claimed is:

1. A variable resistor comprising in combination, a housing with a resistive strip and a conductive strip mounted therein;
    a movable shaft member mounted in the housing;
    contact means mounted on said shaft member for moving along the strips; and
    brake means for resisting the movement of the shaft, comprising:
    a resilient friction sleeve of substantially uniform wall thickness surrounding the shaft and uniformly compressed between the shaft and the housing to the extent that its wall thickness is reduced from about 15% to about 50%.

2. The variable resistor of claim 1 in which the resilient friction sleeve is a solid fluorocarbon resin.

3. The variable resistor of claim 1 in which the resilient friction sleeve is polytetrafluoroethylene.

4. The variable resistor of claim 1 in which the resilient friction sleeve is polytetrafluoroethylene to which has been added about 10% to 20% inert filler.

5. The variable resistor of claim 1 in which the resilient friction sleeve is rubber.

6. The variable resistor of claim 1 in which the friction sleeve has a longitudinal section of its wall removed.

7. In a variable resistor having a housing member with a resistive strip, and a conductive strip mounted therein;
   a shaft member journaled in said housing member with contacts mounted thereon for moving along said strips;
   the improvement in combination therewith comprising, a resilient, hollow, friction sleeve member interposed between said shaft and said housing member;
   said friction sleeve member in its uncompressed state having an outside diameter substantially equal to the inside diameter of the housing member and an inside diameter about 15% to 50% smaller than the outside diameter of said shaft member, so that when the shaft is inserted in said sleeve member the sleeve will be compressed to the end that the normal force between said shaft and the sleeve is increased.

8. In a variable resistor having a housing member with a resistive strip and a conductive strip mounted therein;
   a shaft member journaled in said housing member with contacts mounted thereon for moving along said strips;
   the improvement in combination therewith comprising, a resilient, hollow, friction sleeve member interposed between said shaft and said housing member;
   said friction sleeve member in its uncompressed state having an inside diameter substantially equal to the outside diameter of the shaft and an outside diameter from about 15% to about 50% larger than the inside diameter of the housing member, so that when the sleeve and the shaft are inserted into the housing member, the sleeve will be compressed to the end that the normal force between the shaft and the sleeve is increased.

9. A variable resistor having a housing means with a rotating component and stationary component therein;
   a shaft rotatably journaled in the housing means and attached to the rotating component; and
   means for increasing the torque necessary to rotate the rotating component, said means comprising:
   a resilient, hollow, friction sleeve compressed from about 15% to about 50% between the shaft and the housing means and a resilient annular friction ring compressed from about 15% to about 50% between the housing means and the rotating component.

10. The combination according to claim 9 further characterized by the facts that the annular friction ring is an integral part of the friction sleeve and that a longitudinal section is removed from the sleeve and the ring.

11. A variable resistor having an arcuate resistive element and a conductive element on a non-conductive base;
    contacts for electrically connecting the resistive and conductive element, a rotor to support the contacts, and a shaft to support the rotor;
    housing means for the base and the rotor;
    a mounting bushing for the resistor attached to the housing means having a bore to rotatably support the shaft;
    a counterbore at one end of the mounting bushing; and
    a resilient, hollow friction sleeve of uniform wall thickness disposed in the counterbore and around the shaft with its wall in compression between the shaft and the counterbore to the extent that the wall thickness is reduced from about 15% to about 50% so that a substantial amount of torque is required to rotate the shaft.

12. The combination according to claim 11 further characterized by the fact that the friction sleeve is equipped with an annular flange which is located between the rotor and the counterbored end of the mounting bushing;
    a groove in the shaft adjacent the opposite end of the mounting bushing;
    a C-washer in the groove in engagement with the end of the mounting bushing, the distance from the groove to the rotor being less than the length of the mounting bushing plus the width of the annular flange, so that the flange is compressed between the rotor and the mounting bushing.

13. The combination according to claim 12 further characterized by the fact that a longitudinal section is removed from the sleeve and the flange.

References Cited in the file of this patent

UNITED STATES PATENTS

| | | |
|---|---|---|
| 2,400,099 | Brubaker et al. | May 14, 1946 |
| 2,647,774 | Newberry | Aug. 4, 1953 |
| 2,917,721 | Kelver et al. | Dec. 15, 1959 |

OTHER REFERENCES

Silverstein et al.: No. 315,912, now abandoned, 280 F. 2nd. 152; 126 U.S.P.Q. 393.